US012567358B2

(12) United States Patent
Li et al.

(10) Patent No.: US 12,567,358 B2
(45) Date of Patent: Mar. 3, 2026

(54) DISPLAY PANEL AND DISPLAY DEVICE

(71) Applicant: XIAMEN TIANMA DISPLAY TECHNOLOGY CO., LTD., Xiamen (CN)

(72) Inventors: Jieliang Li, Xiamen (CN); Ping An, Shanghai (CN)

(73) Assignee: XIAMEN TIANMA DISPLAY TECHNOLOGY CO., LTD., Xiamen (CN)

(*) Notice: Subject to any disclaimer, the term of this patent is extended or adjusted under 35 U.S.C. 154(b) by 0 days.

(21) Appl. No.: 18/665,604

(22) Filed: May 16, 2024

(65) Prior Publication Data

US 2024/0304137 A1 Sep. 12, 2024

(30) Foreign Application Priority Data

May 24, 2023 (CN) ......................... 202310593389.4

(51) Int. Cl.
*G09G 3/32* (2016.01)
*G09G 3/3208* (2016.01)
*G09G 3/3233* (2016.01)

(52) U.S. Cl.
CPC ............. *G09G 3/32* (2013.01); *G09G 3/3208* (2013.01); *G09G 3/3233* (2013.01);
(Continued)

(58) Field of Classification Search
CPC .. G09G 3/3233; G09G 3/32; G09G 2320/045; G09G 2320/0233; G09G 2310/0275; G09G 2320/0247; G09G 2330/021; G09G 2310/0243; G09G 2300/0819; G09G 2300/0861;
(Continued)

(56) References Cited

U.S. PATENT DOCUMENTS

2020/0126485 A1* 4/2020 Moon .................. G09G 3/3258
2020/0380915 A1* 12/2020 Yoon .................. H10K 59/1213
(Continued)

FOREIGN PATENT DOCUMENTS

CN 112116897 A 12/2020

OTHER PUBLICATIONS

Office Action of Corresponding CN Patent Application No. 202310593389.4 Dated Aug. 29, 205.

*Primary Examiner* — Dismery Mercedes
(74) *Attorney, Agent, or Firm* — KILPATRICK TOWNSEND & STOCKTON LLP

(57) ABSTRACT

A display panel includes: a light emitting element including a first light emitting element and a second light emitting element; and a pixel circuit including a first pixel circuit and a second pixel circuit. The first and second pixel circuits are respectively connected to the first and second light emitting elements. The pixel circuit is configured to receive a bias adjustment signal including a first bias adjustment signal and a second bias adjustment signal, and the first and second pixel circuits are respectively configured to receive the first and second bias adjustment signals. Areas of the first and second light emitting elements are respectively S1 and S2, and voltage values of the first and second bias adjustment signals are V1 and V2, where $(S1-S2)\times(|V1|-|V2|)\neq 0$. A display device including the display panel is also provided.

18 Claims, 10 Drawing Sheets

(52) U.S. Cl.
CPC ............... *G09G 2310/0251* (2013.01); *G09G 2310/0275* (2013.01); *G09G 2320/0233* (2013.01); *G09G 2320/0247* (2013.01); *G09G 2330/021* (2013.01)

(58) Field of Classification Search
CPC .... G09G 3/3258; G09G 3/20; H10K 59/1213; H10K 59/123
See application file for complete search history.

(56) References Cited

U.S. PATENT DOCUMENTS

| | | | | |
|---|---|---|---|---|
| 2021/0104196 | A1* | 4/2021 | Yuan .................... | G09G 3/3258 |
| 2021/0150985 | A1 | 5/2021 | Li et al. | |
| 2022/0310760 | A1* | 9/2022 | Park ................... | H10K 59/1213 |
| 2022/0335872 | A1* | 10/2022 | Zhang .................. | G09G 3/3233 |
| 2022/0366847 | A1* | 11/2022 | An ....................... | G09G 3/2003 |
| 2023/0093268 | A1 | 3/2023 | Chen | |
| 2023/0377517 | A1 | 11/2023 | Li et al. | |
| 2024/0021155 | A1* | 1/2024 | Hwang ................ | G09G 3/3233 |
| 2024/0130193 | A1* | 4/2024 | Park ..................... | H10K 59/352 |
| 2024/0331618 | A1* | 10/2024 | Son ...................... | G09G 3/3233 |

* cited by examiner

DISPLAY PANEL AND DISPLAY DEVICE

This application claims priority to Chinese Patent Application No. 202310593389.4, filed with the China National Intellectual Property Administration on May 24, 2023 and entitled "DISPLAY PANEL AND DISPLAY DEVICE", which is incorporated herein by reference in its entirety.

FIELD

The present disclosure relate to the field of display devices, and specifically, to a display panel and a display device.

BACKGROUND

With the continuous advancement of science and technology, more and more display devices are widely used in people's daily life and work, which bring great convenience to people's daily life and work, and have become an indispensable and important tool for people today.

The main component of a display device to realize a display function is a display panel. In the display panel, a light emitting element is controlled by the pixel circuits adjacent to the light emitting element to emit light for display. Currently, the display panel has a problem of flickering when emitting light for display.

SUMMARY

In view of the above, a display panel and a display device are provided according to the present disclosure.

A display panel is provided according to one embodiment of the present disclosure, including:

- a light emitting element, where the light emitting element includes a first light emitting element and a second light emitting element; and
- a pixel circuit, where the pixel circuit includes a first pixel circuit and a second pixel circuit, the first pixel circuit is connected to the first light emitting element, and the second pixel circuit is connected to the second light emitting element,
- where the pixel circuit is configured to receive a bias adjustment signal, the bias adjustment signal includes a first bias adjustment signal and a second bias adjustment signal, the first pixel circuit is configured to receive the first bias adjustment signal, and the second pixel circuit is configured to receive the second bias adjustment signal;
- an area of the first light emitting element is S1, and an area of the second light emitting element is S2;
- a voltage value of the first bias adjustment signal is V1, and a voltage value of the second bias adjustment signal is V2, where $(S1-S2)\times(|V1|-|V2|)\neq 0$.

A display device is further provided according to another embodiment of the present disclosure, including the above-described display panel.

BRIEF DESCRIPTION OF DRAWINGS

In order to more clearly describe the embodiments of the present disclosure or the related art, the drawings used in the description of the embodiments or the conventional art are briefly described hereinafter. It is apparent that the drawings described merely shows some embodiments of the present disclosure.

The structures, scales and dimensions shown in the drawings of the specification are only used to cooperate with the content disclosed in the description, for those familiar with the art to understand and read, rather than limit the implementation of the present disclosure, and therefore are of no technical essence. Any modifications of the structures, changes of the scales and adjustments of the dimensions, if not impacting the effects and functions that can be achieve by the present disclosure, shall all fall within the scope of the content according to the present disclosure.

DESCRIPTION OF EMBODIMENTS

The embodiments according to the present disclosure are clearly and completely described hereinafter with reference to the accompanying drawings in embodiments of the present disclosure. It is apparent that the described embodiments are merely some rather than all of embodiments of the present disclosure.

Various modifications and changes may be made in the application without departing from the spirit or scope of the present disclosure. Therefore, the present disclosure intends to cover the modifications and changes of the present disclosure falling within the scope of the corresponding claims (embodiments to be protected) and their equivalents. It should be noted that, the implementations according to the embodiments of the present disclosure may be combined with each other if there is no conflict therebetween.

In order to make the embodiments of the present disclosure clearer, the present disclosure is hereinafter described in more detail with the accompanying drawings and the embodiments.

Figure 1:
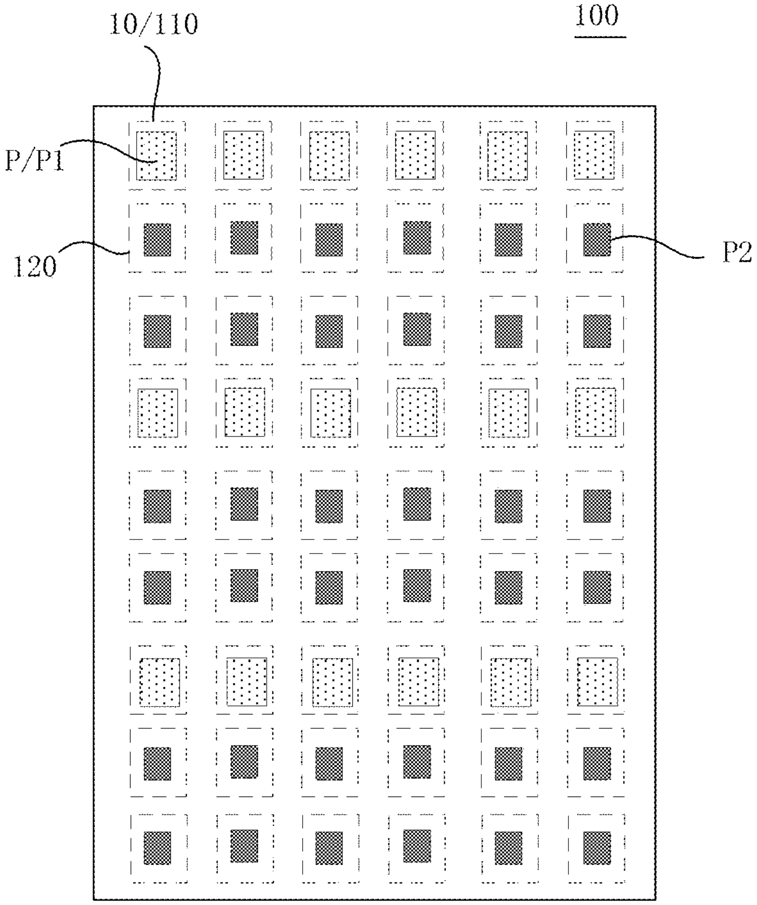
FIG. 1 is a schematic structural diagram of a display panel according to an embodiment of the present disclosure.

Reference is made to FIG. 1, which is a schematic structural diagram of a display panel according to an embodiment of the present disclosure. The display panel 100 includes:

- a light emitting element 20, where the light emitting element 20 includes a first light emitting element P1 and a second light emitting element P2,
- a pixel circuit 10, where the pixel circuit 10 includes a first pixel circuit 110 and a second pixel circuit 120, the first pixel circuit 110 is connected to the first light emitting element P1, and the second pixel circuit 120 is connected to the second light emitting element P2, where the pixel circuit 10 is configured to receive a bias adjustment signal, the bias adjustment signal includes a first bias adjustment signal and a second bias adjustment signal, the first pixel circuit 110 is configured to receive the first bias adjustment signal, and the second pixel circuit 120 is configured to receive the second bias adjustment signal;

an area of the first light emitting element P1 is S1, and an area of the second light emitting element P2 is S2;

a voltage value of the first bias adjustment signal is V1, and a voltage value of the second bias adjustment signal is V2, where $(S1-S2)\times(|V1|-|V2|)\neq 0$.

In the embodiment of the present disclosure, the pixel circuit 10 of the display panel 100 can realize bias adjustment based on an input bias adjustment signal, to solve the flickering problem of the display panel 100. The first pixel circuit 110 of the display panel 100 is configured to receive the first bias adjustment signal, and the second pixel circuit 120 is configured to receive the second bias signal. The pixel circuit 10 can realize the bias adjustment by using the bias adjustment signal. The magnitude of the bias adjustment signal affects a bias regulation performance of a driving transistor in the pixel circuit 10. For the light emitting element 20 with different areas, the currents may be different in order for the same luminance. A driving transistor is used to provide a driving current for the light emitting element 20, the magnitude of the driving current is related to the magnitude of a data signal, and a threshold voltage deviation of the driving transistor has an impact on the accuracy of the data signal input. Therefore, the bias states of the driving transistors corresponding to light emitting elements 20 with different light emitting areas can be different. Therefore, different bias states can be adjusted with different bias adjustment signals, which can achieve good adjustment effects for the bias states of different transistors in a more targeted manner, and the light emitting elements 20 with different areas can have substantially the same brightness when displaying the same brightness.

Figure 2:
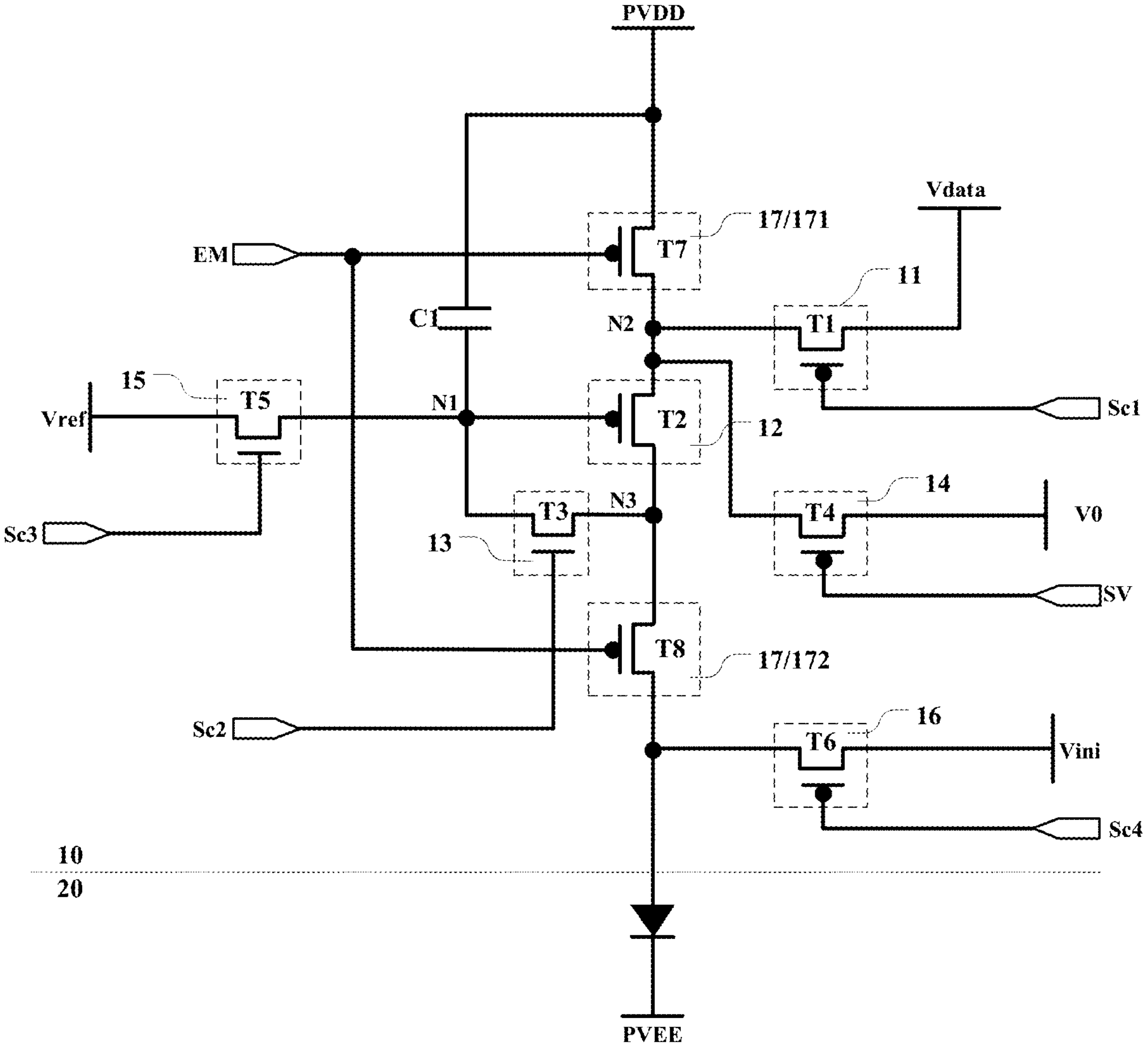
FIG. 2 is a schematic diagram of a pixel circuit according to an embodiment of the present disclosure.
Figure 3:
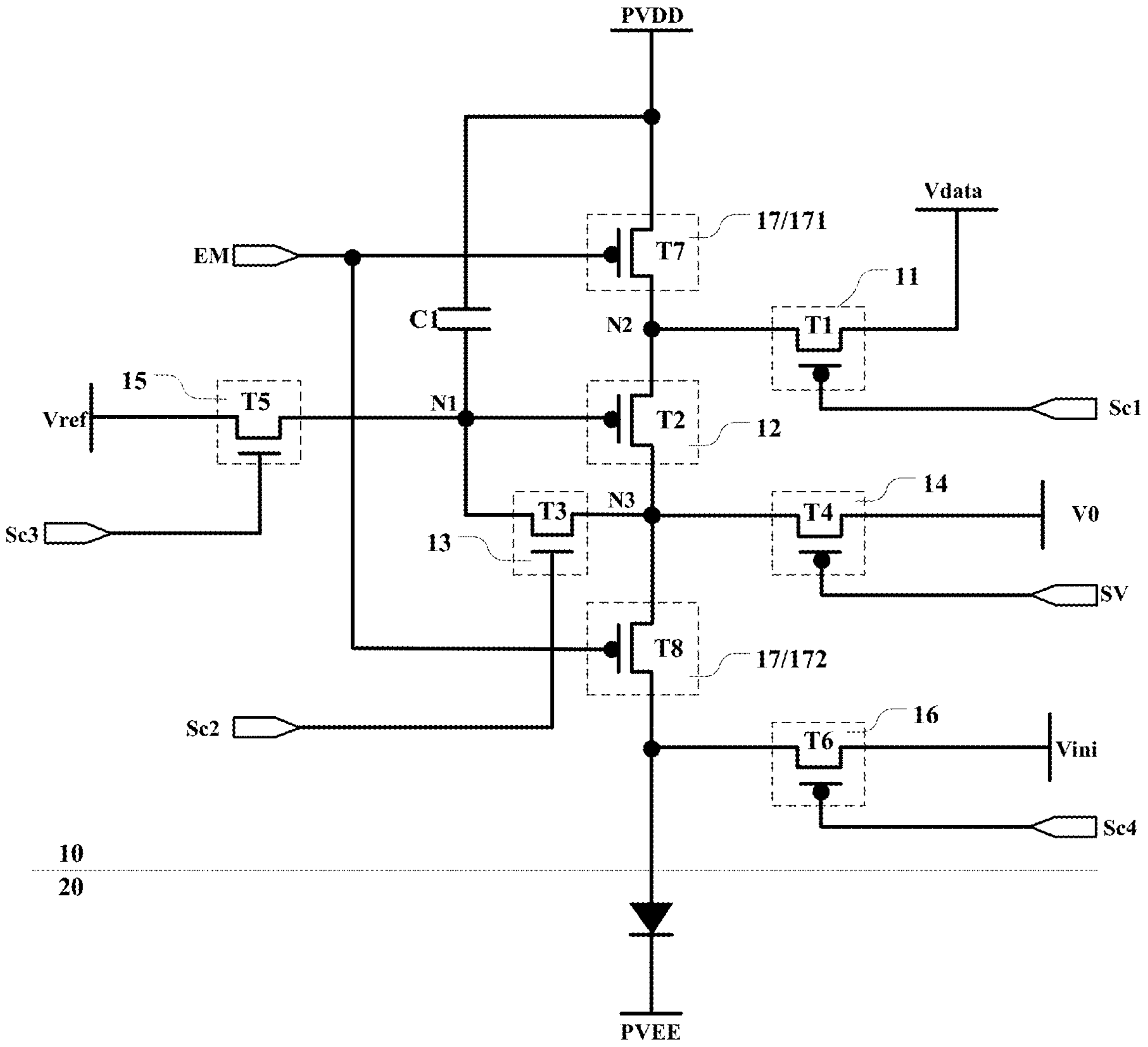
FIG. 3 is a schematic diagram of another pixel circuit according to an embodiment of the present disclosure.
Figure 4:
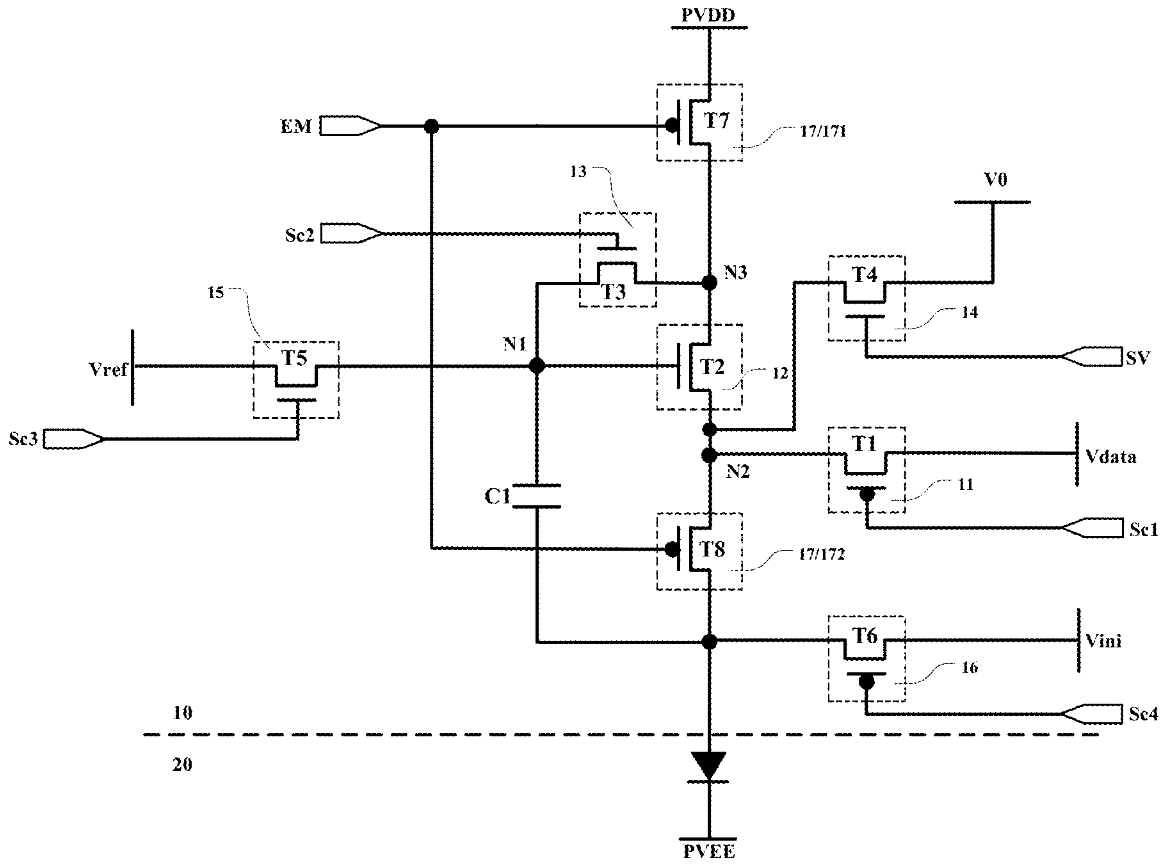
FIG. 4 is a schematic diagram of yet another pixel circuit according to an embodiment of the present disclosure.
Figure 5:
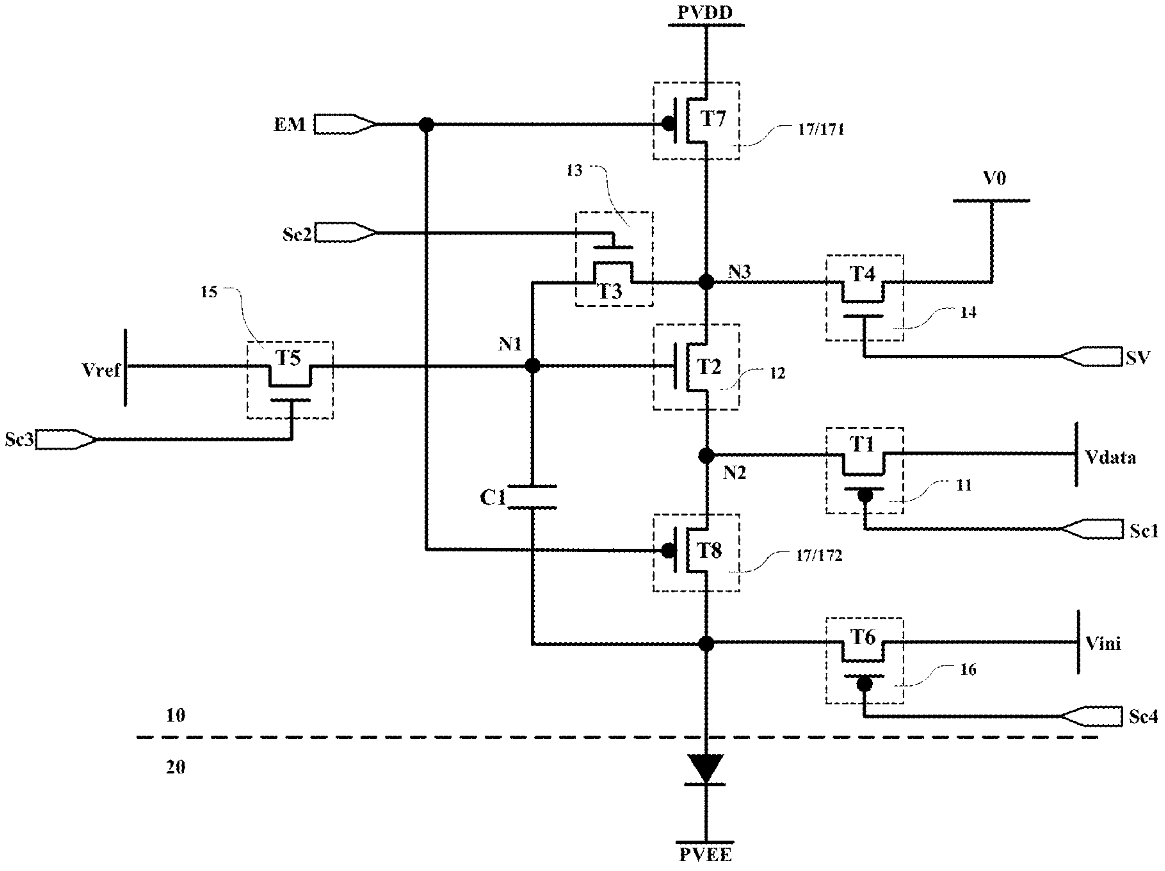
FIG. 5 is a schematic diagram of still another pixel circuit according to an embodiment of the present disclosure.

Reference is made to FIG. 2 to FIG. 5, where FIG. 2 is a schematic diagram of a pixel circuit according to an embodiment of the present disclosure, FIG. 3 is a schematic diagram of another pixel circuit according to an embodiment of the present disclosure, and FIG. 4 is a schematic diagram of yet another pixel circuit according to an embodiment of the present disclosure, and FIG. 5 is a schematic diagram of still another pixel circuit according to an embodiment of the present disclosure. The pixel circuit 10 includes a data writing module 11, a driving module 12, a compensation module 13 and a bias adjustment module 14. The driving module 12 includes a driving transistor T2, and the driving transistor T2 is configured to provide a driving current for the light emitting element 20 of the display panel 100. The data writing module 11 is connected to a first electrode (i.e., node N2) of the driving transistor T2, and is configured to provide a data signal Vdata for the driving transistor T2. The bias adjustment module 14 is connected to the first electrode (i.e., node N2) or a second electrode (i.e., node N3) of the driving transistor T2, and is configured to provide a bias adjustment signal V0 for the driving transistor T2. The compensation module 13 is connected between a gate (i.e., node N1) and the second electrode (i.e., node N3) of the driving transistor T2, and is configured to compensate for a threshold voltage of the driving transistor T2.

In a case that the pixel circuit 10 is the first pixel circuit 110, the light emitting element 20 connected is the first light emitting element P1 with the area S1, and the bias adjustment signal V0 is the first bias adjustment signal V1. In a case that the pixel circuit 10 is the second pixel circuit 120, the light emitting element 20 connected is the second light emitting element P2 with the area S2, and the bias adjustment signal V0 is the second bias adjustment signal V2.

In addition, the pixel circuit 10 may also include a reset module 15 configured to provide a reset signal Vref for the gate of the driving transistor T2; an initialization module 16 configured to provide an initialization signal Vini for the light emitting element 20; and a light emitting control module 17 configured to selectively enable the light emitting element 20 to enter a light emitting stage. In an embodiment, the light emitting control module 17 includes a first light emitting control module 171 and a second light emitting control module 172. The first light emitting control module 171 is connected between a first power signal terminal and one electrode of the driving transistor T2. The second light emitting control module 172 is connected between another electrode of the driving transistor T2 and the light emitting element 20. The light emitting element 20 is connected between an output terminal of the pixel circuit and a second power signal terminal.

In an embodiment, a control terminal of the data writing module 11 receives a first scanning signal Sc1, and the first scanning signal Sc1 controls the data writing module 11 to be turned on and turned off. A control terminal of the compensation module 13 receives a second scanning signal Sc2, and the scanning signal Sc2 controls the compensation module 13 to be turned on and turned off. A control terminal of the bias adjustment module 14 receives a bias adjustment control signal SV, and the bias adjustment control signal SV controls the bias adjustment module 14 to be turned on and turned off. A control terminal of the reset module 15 receives a third scanning signal Sc3, and the third scanning signal Sc3 controls the reset module 15 to be turned on and turned off. A control terminal of the initialization module 16 receives a fourth scanning signal Sc4, and the fourth scanning signal Sc4 controls the initialization module 16 to be turned on and turned off. A control terminal of the light emitting control module 17 receives a light emitting control signal EM, and the light emitting control signal EM controls the light emitting control module 17 to be turned on and turned off.

In addition, in an embodiment, the data writing module 11 includes a data writing transistor T1, and the first scanning signal Sc1 controls the data writing transistor T1 to be turned on and turned off. The compensation module 13 includes a compensation transistor T3, and the second scanning signal Sc2 controls the compensation transistor T3 to be turned on and turned off. The bias adjustment module 14 includes a bias adjustment transistor T4, and the bias adjustment control signal SV controls the bias adjustment transistor T4 to be turned on and turned off. The reset module 15 includes a reset transistor T5, and the third scanning signal Sc3 controls the reset transistor T5 to be turned on and turned off. The initialization module 16 includes an initialization transistor T6, and the fourth scanning signal Sc4 controls the initialization transistor T6 to be turned on and turned off. The first light emitting control module 171 includes a first light emitting control transistor T7, the second light emitting control module 172 includes a second light emitting control transistor T8, the light emitting control signal EM controls the first light emitting control transistor T7 and the second light emitting control transistor T8 to be turned on and turned off.

It should be noted that, at least two signals among the signals such as the first scanning signal Sc1, the second scanning signal Sc2, the third scanning signal Sc3, the fourth scanning signal Sc4, the bias adjustment control signal SV, the light emitting control signal EM, can be the same signal, if permitted. For example, in a case that the bias adjustment transistor T4 and the initialization transistor T6 are of the same type, the bias adjustment control signal SV and the fourth scanning signal Sc4 may be the same signal.

As shown in FIG. 2 and FIG. 3, the driving transistor T2 is a PMOS transistor, and the pixel circuit 10 further includes a storage capacitor C1, where the storage capacitor C1 has a first electrode connected to the first power signal terminal and a second electrode connected to the gate of the driving transistor T2, and is configured to store a signal transmitted to the gate of the driving transistor T2. As shown in FIG. 2, the bias adjustment module 14 is connected to the first electrode of the driving transistor T2, namely the node N2. As shown in FIG. 3, the bias adjustment module 14 is connected to the second electrode of the driving transistor T2, namely node N3. As shown in FIG. 4 and FIG. 5, the driving transistor T2 is an NMOS transistor, and the pixel circuit 10 further includes the storage capacitor C1. The storage capacitor C1 has a first electrode connected to the light emitting element 20 and a second electrode connected to the gate of the driving transistor T2, and is configured to store a signal transmitted to the gate of the driving transistor T2. As shown in FIG. 4, the bias adjustment module 14 is connected to the first electrode of the driving transistor T2, namely node N2. As shown in FIG. 5, the bias adjustment module 14 is connected to the second electrode of the driving transistor T2, namely node N3.

In this way, the bias adjustment module 14 is provided in the pixel circuit 10, and is configured to provide the bias adjustment signal V0 for the driving transistor T2. A potential difference between the gate and the first electrode or the second electrode of the driving transistor T2 during a light emitting process can cause a bias problem. That is, in a case that the driving transistor T2 is the PMOS transistor, the bias problem will arise, if a gate voltage is greater than a voltage of the first electrode or the second electrode of the driving transistor T2 when the driving transistor T2 is turned on; or, in a case that the driving transistor T2 is the NMOS transistor, the bias problem will also arise, if the gate voltage is lower than the voltage of the first electrode or the second electrode of the driving transistor T2 when the driving transistor T2 is turned on. The bias problem causes a reverse electric field inside the driving transistor T2, resulting in carrier polarization and thereby shift of the threshold voltage of the driving transistor T2. The shift of the threshold voltage of the driving transistor T2 causes a driving current generated by the driving transistor T2 to be unstable, to lead to flickering problems especially when the gray scale changes. In the embodiment, by providing the bias adjustment signal V0 for the first electrode or the second electrode of the driving transistor T2, the voltage difference between the gate and the first electrode or the second electrode of the driving transistor T2 is adjusted in time to offset the bias and prevent the threshold voltage of the driving transistor T2 from shifting, to help reduce the flicker phenomenon.

It should be noted that FIGS. 2 to 5 only illustrate some rather than all arrangements of the bias adjustment module 14 in the pixel circuit, and that various other arrangements of the bias adjustment module 14 that can provide the bias adjustment signal for the pixel circuit to adjust the bias state of the driving transistor T2 and meet the limitation of the bias adjustment signal V0 in this embodiment shall all fall within the scope of the present disclosure, which are not elaborated herein.

As shown in FIG. 2 to FIG. 5, the first power signal terminal is provided with a high-level power signal PVDD, the second power signal terminal is provided with a low-level power signal PVEE, and an anode of the light emitting element 20 is connected to the output terminal of the pixel circuit 20, and a cathode of the light emitting element 20 is connected to the second power signal terminal. In one embodiment, the second power signal terminal is provided with the high-level power signal PVDD, the first power signal terminal is provided with the low-level power signal PVEE, the cathode of the light emitting element 20 is connected to the output terminal of the pixel circuit 20, and the anode of the light emitting element 20 is connected to the second power signal terminal.

The bias adjustment signal is mainly to adjust the bias state of the driving transistor T2, and the bias state of the driving transistor T2 is mainly caused by a voltage difference between a source and the gate of the driving transistor T2 and a voltage difference between a drain and the gate of the driving transistor T2. For example, the driving transistor T2 is a PMOS transistor, and a gate potential of the driving transistor T2 is Vdata−|Vth| during a light emitting stage, where |Vth| is the threshold voltage; a source potential of the driving transistor T2 is PVDD. In this case, if the source potential of the driving transistor T2 is greater than the gate potential and the drain potential is lower than the gate potential, there will be a reverse built-in electric field between the gate and the drain, which may cause the carrier polarization inside the driving transistor T2, resulting in a shift in the threshold voltage and thereby the bias problem of the driving transistor T2. In order to solve the bias problem, a bias adjustment stage is set in a frame following the light emitting stage, during which a higher bias adjustment signal V0 is applied to the drain of the driving transistor T2, and the drain voltage is greater than the gate voltage, to offset the built-in electric field. This is the principle of the bias adjustment process, which also applies in a case that the driving transistor T2 is an NMOS transistor, except that the drain voltage may be higher than the gate voltage during the light emitting stage and a lower potential is used as the bias adjustment signal V0.

The bias state can cause the threshold voltage of the driving transistor T2 to shift, and the shift of the threshold voltage will cause data written by the driving transistor T2 in the data writing stage to be inaccurate, which stabilizes only after multiple refresh operations. Since the data signal Vdata determines the driving current, an inaccurate input of the data signal Vdata can lead to an inaccurate driving current, which causes flickering phenomenon in images seen by human eyes.

As described above, for light emitting elements 20 with different areas, the currents may be different in order for the same luminance; the driving transistor T2 is configured to provide the driving current for the light emitting element 20, the magnitude of the driving current is related to the magnitude of the data signal Vdata, and the deviation of the threshold voltage |Vth| of the driving transistor T2 can affect the accuracy of the input data signal Vdata. Therefore, the bias states of the driving transistors T2 corresponding to the light emitting elements 20 with different light emitting areas may be different. In view of this, different bias adjustment signals V0 are used for adjustment of different bias states, which can achieve good adjustment effects for different bias states of the driving transistors T2 in a more targeted manner.

In some embodiments of the present disclosure, it may be configured that $(S1-S2)\times(|V1|-|V2|)>0$. In a case that $S1>S2$, $|V1|>|V2|$, and in a case that $S1<S2$, $|V1|</V2|$. If the driving transistor T2 is the PMOS transistor, and V1 and V2 are both positive voltages, $(S1-S2)\times(V1-V2)>0$. If the driving transistor T2 is the NMOS transistor, and V1 and V2 are both negative voltages, $(S1-S2)\times(V1-V2)<0$. The inaccurate input of the data signal Vdata causes the inaccuracy of the driving current, and in a case that the area of the light emitting element 20 is larger, the inaccuracy of the driving current leads to more significant non-uniformity of light emission and severer flickering problem. Therefore, for the light emitting element 20 with a larger light emitting area, a larger bias adjustment signal V0 is input, and the light emitting element 20 with a larger light emitting area can offset the bias state as soon as possible, to reduce the flicker phenomenon caused by the bias problem of the driving transistor T2 during the gray scale change process. In a case that the driving transistor is a PMOS transistor, the light emitting element 20 with a larger light emitting area receives a positive bias adjustment signal V0 with a larger absolute value. In a case that the driving transistor is an NMOS transistor, the light emitting element with a larger light emitting area 20 receives a negative bias adjustment signal V0 with a larger absolute value.

Based on the above description, it can be known that the larger the area of the light emitting element 20 is, the larger the absolute value of the bias adjustment signal V0 provided for the pixel circuit 10 is. On the contrary, the smaller the area of the light emitting element 20 is, the smaller the absolute value of the bias adjustment signal V0 provided for the pixel circuit 10 is. This is because, for a light emitting element 20 with a larger light emitting area, the non-uniformity of light emission caused by the inaccurate driving current is more significant, and the flickering problem is severer, in which case a larger bias adjustment signal V0 is applied for the light emitting element 20 with a larger light emitting area to offset the bias state as soon as possible, to mitigate the flickering problem caused by the bias issue of the driving transistor T2 during the low gray scale change process. On the contrary, for a light emitting element 20 with a smaller light emitting area, the non-uniformity of light emission caused by the inaccurate driving current is less significant, and the flickering problem is less severe, in which case a smaller bias adjustment signal V0 is sufficient for the light emitting element 20 with a smaller light emitting area to quickly offset the bias state.

In a case that $(S1-S2)\times(|V1|-|V2|>0$, if $S1>S2$, then $|S1/S2|>|V1/V2|$; or, if $S1<S2$, then $|S1/S2|<|V1/V2|$. V1 is the bias adjustment signal V0 provided to the first pixel circuit 110, and V2 is the bias adjustment signal V0 provided to the second pixel circuit 120, which are mainly configured to adjust the bias state of the driving transistor T2 in the pixel circuit 10. V1 and V2 are both in a range of −6V to +6V, and a difference between V1 and V2 is generally not large. If the difference is large, it may cause discrepancy between bias states of different driving transistors T2, as a result of which, the light emitting uniformity of the light emitting elements 20 with different areas is deteriorated. Therefore, in a case that $S1>S2$, $|V1/V2|$ is generally small, and in a case that $S1<S2$, $|V1/V2|$ is generally large. If there is little difference between the light emitting areas of the light emitting elements 20, there is no need to change the bias adjustment signal V0. Only in a case that the difference between the light emitting areas is large, are the bias states separately adjusted for light emitting elements 20 with different areas. Therefore, if $S1>S2$, $|S1/S2|>|V1/V2|$; similarly, if $S1<S2$, $|S1/S2|<|V1/V2|$.

In some embodiments of the present disclosure, it may be configured that $(S1-S2)\times(|V1|-|V2|)<0$. In this case, the pixel circuits 10 connected to the light emitting elements 20 with different areas are provided with different bias adjustment signals V0, where a light emitting element 20 with a larger area correspond to a bias adjustment signal V0 with a smaller absolute value, and a light emitting element 20 with a smaller area correspond to a bias adjustment signal with larger absolute value.

In some embodiments of the present disclosure, it may be the case that $(S1-S2)\times(V1-V2)<0$. For example, in a case that the display panel 100 includes a normal display region and a special functional region (such as an under-screen camera region), the area of the light emitting element 20 in the special functional region is relatively large, but display requirements for the special functional region are not high. In this case, the pixel circuit 10 connected to the light emitting element 20 in the special functional region does not need an adjustment signal V0 with a large absolute value, to save power consumption. Or, the refresh rate of the normal display region is low, while the data refresh rate of the special functional region is relatively high due to special functional requirements. In this case, since the data refresh rate of the special functional region is relatively high, the driving transistor T2 maintains one bias state for a relatively short period of time as the data signal Vdata received by the driving transistor T2 in the pixel circuit 10 keeps changing at a high frequency. Thus, the bias problem is not severe, and a bias adjustment signal V0 with a small absolute value may also be set to save power consumption.

In a case that $(S1-S2)\times(|V1|-|V2|)<0$, if $S1>S2$, then $|S1/S2|>|V2/V1|$; or, if $S1<S2$, then $|S1/S2|<|V2/V1|$. As described above, the bias adjustment signal V0 is mainly configured to adjust the bias state of the driving transistor T2 in the pixel circuit 10. V1 and V2 are in a range of −6V to +6V, and the difference between V1 and V2 is generally not large. If it is large, it may cause discrepancy between states of different driving transistors T2, as a result of which, the light emitting uniformity of light emitting elements 20 with different areas is deteriorated. Therefore, if $S1>S2$, $|V2/V1|$ is generally small; if $S1<S2$, $|V2/V1|$ is generally large. If there is little difference between the light emitting areas of the light emitting elements 20, there is no need to change the bias adjustment signal V0. Only in a case that the difference of the light emitting areas is large, are the bias states separately adjusted for light emitting elements 20 with different areas. Therefore, if $S1>S2$, then $|S1/S2|>|V2/V1|$; or, if $S1<S2$, then $|S1/S2|<|V2/V1|$.

In some embodiments of the present disclosure, $|S1-S2|/|S2|>|V1-V2|/|V2|$. For the first light emitting element P1 and the second light emitting element P2 with different light emitting areas, as noted above, the difference between the bias adjustment signals V0 corresponding to the first light emitting element P1 and the second light emitting element P2 is generally not large compared with the light emitting area difference between the first light emitting element P1 and the second light emitting element P2. That is, the difference between V1 and V2 is not large, and the light emitting elements 20 with different areas have good uniformity of light emission. Therefore, the ratio of $|S1-S2|$ to $|S2|$ is generally greater than the ratio of $|V1-V2|$ to $|V2|$. If the ratio of $|V1-V2|$ to $|V2|$ is large, it may cause discrepancy between states of different driving transistors T2, which leads to poor uniformity of light emission of the light emitting elements 20 with different areas; hence it is configured that $|S1-S2|/|S2|>|V1-V2|/|V2|$.

In an embodiment of the present disclosure, the first pixel circuit 110 includes a first driving transistor, and the second pixel circuit 120 includes a second driving transistor. A width-to-length ratio of the channel region of the first driving transistor is R1, and a width-to-length ratio of the channel region of the second driving transistor is R2, where $(R1-R2)\times(|V1|-|V2|)\neq 0$.

Based on the above description, the first driving transistor is the driving transistor T2 in the first pixel circuit 110, the second driving transistor is the driving transistor T2 in the second pixel circuit 120, the bias adjustment signal V0 inputted into the first pixel circuit 110 is the first bias adjustment signal V1 and the bias adjustment signal V0 inputted into the second pixel circuit 120 is the second bias adjustment signal V2. The light emitting elements 20 with different light emitting areas have different requirements for the driving current. In a case that the driving current is inaccurate, the larger the area of the light emitting element 20 is, the severer the non-uniformity problem is. The driving transistor T2 is configured to providing a driving current for the light emitting element 20, and the width-to-length ratio of the channel region of the driving transistor T2 determines the ability of the driving transistor T2 to output the driving current. Therefore, for light emitting elements 20 with different light emitting areas, the width-to-length ratio of the channel region of the driving transistor T2 is different. In practice, in a case that the width-to-length ratio of the channel region of the driving transistor T2 is different, the bias state of the driving transistor T2 may also be different. In this case, different bias adjustment signals are provided for different driving transistors T2 to adjust the bias states thereof independently, and when the light emitting elements 20 with different areas display the same brightness, the brightness uniformity is better. Therefore, it is configured that $(R1-R2)\times(|V1|-|V2|)\neq 0$.

In some embodiments of the present disclosure, in a case that $(R1-R2)\times(|V1|-|V2|)\neq 0$, it may be configured that $(R1-R2)\times(V1|-|V2)<0$. In this case, a bias adjustment signal V0 provided to the pixel circuit 10 corresponding to a driving transistor T2 with a larger width-to-length ratio of the channel region is smaller. On the contrary, a bias adjustment signal V0 provided to the pixel circuit 10 corresponding to a driving transistor T2 with a smaller width-to-length ratio of the channel region is larger. In a case that the driving transistor T2 is a PMOS transistor, a smaller width-to-length ratio indicates a larger length of the channel region at a given width of the channel region, while the larger length of the channel region may cause a larger voltage difference between the gate and the drain of the driving transistor T2, at given gate voltage and source voltage of the driving transistor and a given driving current. Since the bias problem of the driving transistor T2 is caused by the bias voltage between the gate and the drain, the bias problem may be severer in this case. Therefore, for a driving transistor T2 with a smaller width-to-length ratio of the channel region, a bias adjustment signal V0 with a larger absolute value is used to alleviate the bias problem, to fully offset the bias voltage. On the contrary, for a driving transistor T2 with a larger width-to-length ratio of the channel region, a bias adjustment signal V0 with a smaller absolute value is used to alleviate the bias problem, to fully offset the bias voltage.

In some embodiments of the present disclosure, in a case that $(R1-R2)\times(|V1|-|V2|)<0$, if $R1>R2$, then $|R1/R2|>|V2/V1|$; or, if $R1<R2$, then $|R1/R2|</V2/V1|$. As described above, the bias adjustment signal V0 is mainly configured to adjust the bias state of the driving transistor T2, and the bias adjustment signal V0 is generally in a range from −6V to +6V. In order to avoid the problem of non-uniform display between different light emitting elements 20, the values of V1 and V2 are generally not much different. As for R1 and R2, in a case that the difference between R1 and R2 is not large, V1 and V2 are not designed differentiated; only in a case that the difference between R1 and R2 is large and thereby results in a significant bias problem between different driving transistors T2, are V1 and V2 designed differentiated for adjustment of different driving transistors T2. Therefore, if $R1>R2$, it is configured that $|R1/R2|>|V2/V1|$; or, if $R1<R2$, it is configured that $|R1/R2|<|V2/V1|$.

In some embodiments of the present disclosure, in a case that $(R1-R2)\times(|V1|-|V2|)\neq 0$, it may be configured that $(R1-R2)\times(|V1|-|V2|)>0$. In this case, a bias adjustment signal V0 provided to the pixel circuit 10 corresponding to a driving transistor T2 with a larger width-to-length ratio of the channel region is larger. On the contrary, a bias adjustment signal V0 provided to the pixel circuit 10 corresponding to a driving transistor T2 with a smaller width-to-length ratio of the channel region is smaller. In some embodiments, the display panel 100 may include a normal display region and a special functional region. In order for some special functions, the width-to-length ratio of the driving transistor T2 in the special functional region may be small, while display requirements for the special functional region may not be high and can be met without a bias adjustment signal V0 with a large absolute value, to save power consumption. Or, in a case that the data refresh rate of the special functional region is relatively high, the bias problem is not serious because the gate voltage and the drain voltage of the driving transistor T2 keep changing at a high frequency and the driving transistor does not remain in a same bias state for a long time. In this case, a bias adjustment signal V0 with a small absolute value may be configured, which is sufficient to meet the requirements and can save power consumption, and it may be configured that $(R1-R2)\times(|V1|-|V2|>0$.

In some embodiments of the present disclosure, in a case that $(R1-R2)\times(|V1|-|V2|)>0$, if $R1>R2$, then $|R1/R2|>|V1/V2|$; or, if $R1<R2$, then $|R1/R2|<|V1/V2|$. The bias adjustment signal V0 is mainly configured to adjust the bias state of the driving transistor T2, and is generally in the range of −6V to +6V. In order to avoid the problem of non-uniform display between different light emitting elements 20, the values of V1 and V2 are generally not much different. As for R1 and R2, in a case that the difference between R1 and R2 is not large, V1 and V2 are not designed differentiated; only in a case that the difference between R1 and R2 is large and thereby results in a significant bias problem between different driving transistors T2, are V1 and V2 designed differentiated for adjustment of different driving transistors T2. Therefore, if $R1>R2$, it may be configured that $|R1/R2|>|V1/V2|$; or, if $R1<R2$, it may be configured that $|R1/R2|<|V1/V2|$.

Figure 6:
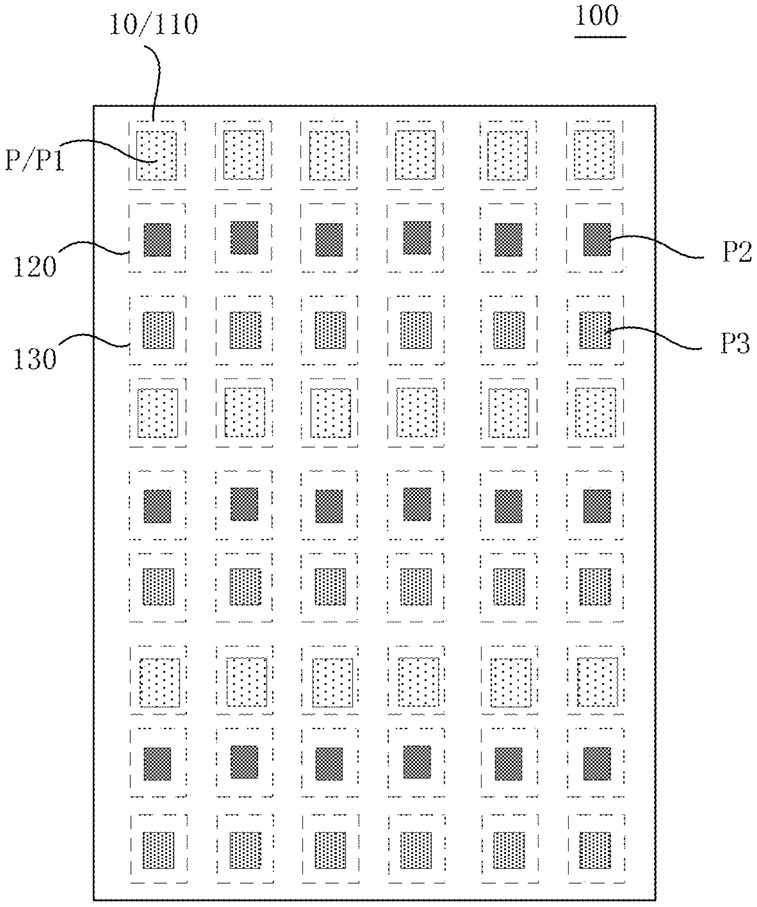
FIG. 6 is a schematic structural diagram of another display panel according to an embodiment of the present disclosure.

Reference is made to FIG. 6, which is a schematic structural diagram of another display panel according to an embodiment of the present disclosure. On the basis of the above embodiments, in the display panel 100 as shown in FIG. 6, the light emitting element 20 further includes a third light emitting element P3, and the pixel circuit 10 further includes a third pixel circuit 130, where the third pixel circuit 130 is connected to the third light emitting element P3. The bias adjustment signal V0 includes a third bias adjustment signal. An area of the third light emitting element P3 is S3, and the voltage value of the third bias adjustment signal is V3, where |V1−V2|>|V2−V3|≥0, and/or |V1−V2|>|V1−V3|≥0.

Since (S1−S2)*(|V1|−|V2|)≠0, V1≠V2. V2 and V3 may be the same or different, and V1 and V3 may be the same or different. As described above, in a case that the difference between S1 and S2 is large, V1 and V2 are different, and to independently adjust the bias states of the driving transistors T2 in the first pixel circuit 110 and the second pixel circuit 120. In a case that there is the third light emitting element P3, a difference between S1 and S3 is smaller than a difference between S1 and S2. Or, a difference between S2 and S3 is smaller than a difference between S1 and S2. Or, a difference between R1 and R3 is smaller than a difference between R1 and R2. Or, a difference between R2 and R3 is smaller than a difference between R1 and R2. Accordingly, the difference between V1 and V3 may be set to be smaller than the difference between V1 and V2, that is, |V1−V2|>|V1−V3|≥0. Or, the difference between V2 and V3 is smaller than the difference between V1 and V2, that is, |V1−V2|>|V2−V3|≥0. Especially, in a case that |V1−V2|>|V1−V3|≥0, it may be configured that V1=V3; or, in a case that |V1−V2|>|V2−V3|≥0, it may be configured that V2=V3. In this way, in a case that there is little difference between the light emitting areas of the light emitting elements 20 or between the width-to-length ratios of the channel regions of the corresponding driving transistors T2, the same bias adjustment signal V0 may be used to simplify the manufacturing process of the display panel.

The display panel 100 includes light emitting elements 20 with three different light emitting colors, which are respectively configured to emit lights with three primary colors to realize a color display. The light emitting elements 20 with the three different light emitting colors may respectively be the first light emitting element P1, the second light emitting element P2 and the third light emitting element P3 described above. Generally, the light emitting elements 20 with different light emitting colors have different light emitting efficiencies. In a case that the difference between light emitting efficiencies of light emitting elements 20 of different light emitting colors is large, in order to achieve a good white balance display effect, a light emitting element 20 with a smaller light emitting efficiency has a larger area, and a light emitting element 20 with a higher light emitting efficiency has a smaller area. If the difference between light emitting efficiencies of the light emitting elements 20 of different light emitting colors is small, the light emitting areas thereof may be set to be the same or similar. The light emitting elements 20 of the three different light emitting colors in the display panel 100 may be a red light emitting element R, a green light emitting element G and a blue light emitting element B respectively.

In the embodiment shown in FIG. 1, for the light emitting elements 20 with the three light emitting colors in the display panel 100, the light emitting element 20 with the highest light emitting efficiency is the first light emitting element P1, the light emitting element 20 with the smallest light emitting efficiency is the second light emitting element P2, and the light emitting element 20 with the medium light emitting efficiency is the first light emitting element P1 or the second light emitting element P2. In the embodiment shown in FIG. 6, for the light emitting elements 20 with the three light emitting colors in the display panel 100, the light emitting element 20 with the highest light emitting efficiency is the first light emitting element P1, the light emitting element 20 with the smallest light emitting efficiency is the second light emitting element P2, and the light emitting element 20 with the medium light emitting efficiency is the third light emitting element.

In some embodiments, as described above, the display panel 100 includes a normal display region and a special functional region, and the area of the light emitting element 20 in the normal display region and the area of the light emitting element 20 in the special functional region are different. The light emitting element 20 in one of the normal display region and the special functional region may be set as the first light emitting element P1, and the light emitting element 20 in the other of the normal display region and the special functional region may be set as the second light emitting element P2.

The display panel 100 may be configured with light emitting elements 20 with three different light emitting colors, and the light emitting elements 20 are arranged in an array. It may be configured that the light emitting colors of light emitting elements 20 in a same row are the same, the light emitting colors of light emitting elements 20 in different rows are different, and the light emitting colors of light emitting elements 20 in any three adjacent rows are different from each other, as shown in FIG. 1 and FIG. 6. Or, it may be configured that the light emitting colors of light emitting elements 20 in the same column are the same, the light emitting colors of light emitting elements 20 in different columns are different, and the light emitting colors of light emitting elements 20 in any three adjacent columns are different from each other. In these two arrangements of light emitting elements 20, light emitting elements 20 of one light emitting color are each used as the first light emitting element P1, and light emitting elements 20 of the other two light emitting colors are each used as the second light emitting element P2. Or, the light emitting elements 20 of three different light emitting colors are respectively a first light emitting element P1, a second light emitting element P2 and a third light emitting element P3.

Figure 7:
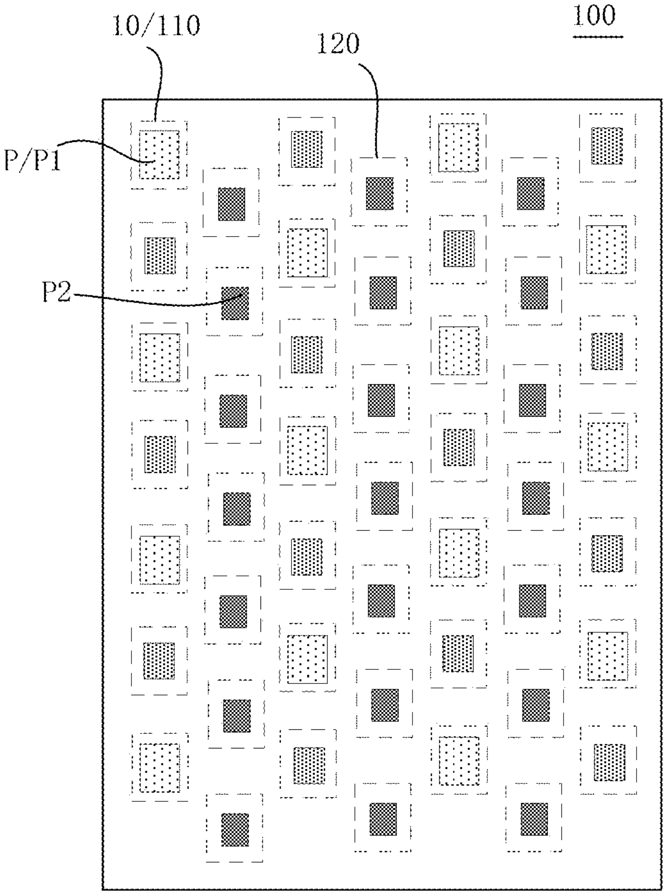
FIG. 7 is a schematic structural diagram of yet another display panel according to an embodiment of the present disclosure.

Reference is made to FIG. 7, which is a schematic structural diagram of yet another display panel according to an embodiment of the present disclosure. The display panel 100 includes light emitting elements 20 with three different light emitting colors. The display panel 100 includes multiple rows of light emitting elements 20 and multiple columns of light emitting elements 20. In this embodiment, in one of any two adjacent rows, all light emitting elements 20 are of the first light emitting color, and in the other row, light emitting elements 20 of the second light emitting color and light emitting elements 20 of the third light emitting color are alternately distributed. Further, the light emitting elements 20 in two adjacent rows are staggered; that is, a gap between two adjacent light emitting elements 20 in one row corresponds to a light emitting element 20 in the other row. In one of any two adjacent columns, all light emitting elements 20 are of the first light emitting color, and in the other column, light emitting elements 20 of the second light emitting color and light emitting elements 20 of the third light emitting color are alternately distributed. Further, the light emitting elements 20 in two adjacent columns are staggered; that is, a gap between two adjacent light emitting elements 20 in one column corresponds to a light emitting element 20 in the other column.

In an embodiment of the present disclosure, the arrangement of the light emitting elements 20 in the display panel 100 may be configured as needed, which may be an existing arrangement of light emitting elements, and is not limited in the embodiments of the present disclosure.

Generally, light emitting elements 20 of the same light emitting color have the same area, and light emitting elements 20 of different light emitting colors have different areas. Under some exceptional circumstances, light emitting elements 20 of the same light emitting color may be configured to have different areas. For example, the display panel 100 includes a normal display region and a special functional region (such as an under-screen camera region), and the light emitting elements 20 of the same light emitting color have different areas in the normal display region and the special functional region.

Generally, light emitting elements 20 with a large difference in light emitting efficiency therebetween have different areas, and a light emitting element 20 with a larger light emitting efficiency has a smaller area. Under some exceptional circumstances, all light emitting elements in the above-mentioned special functional region may be configured to have the same area, for example, even though in this case the difference between light emitting efficiencies of the light emitting elements 20 is large.

In an embodiment of the present disclosure, it is configured that $S1 \neq S2 \neq S3$. The first light emitting element P1, the second light emitting element P2, and the third light emitting element P3 may be three light emitting elements 20 with different light emitting colors. Under normal conditions, the light emitting efficiencies of the three light emitting elements are different. In order to achieve a good white balance display effect, the areas of the three light emitting elements 20 are different from each other.

In a case that there is the third light emitting element P3, it may be configured that $|S1-S2|>|S1-S3|\geq 0$; and/or, it may be configured that $|S1-S2|>|S2-S3|\geq 0$. Since $(S1-S2)\times(|V1|-|V2|)\neq 0$, $S1\neq S2$. In practice, S2 and S3 may be the same or different, and S1 and S3 may be the same or different. As described above, in a case that the difference between S1 and S2 is large, V1 and V2 are different, and to independently adjust the bias states of the driving transistors T2 in the first pixel circuit 110 and the second pixel circuit 120. In a case that there is the third light emitting element P3, the difference between S1 and S3 is smaller than the difference between S1 and S2, or the difference between S2 and S3 is smaller than the difference between S1 and S2. Accordingly, the difference between V1 and V3 is smaller than the difference between V1 and V2; that is, $|V1-V2|>|V1-V3|\geq 0$. Or the difference between V2 and V3 is smaller than the difference between V1 and V2; that is, $|V1-V2|>|V2-V3|\geq 0$.

In a case that there is the third light emitting element P3, it may be configured that $|R1-R2|>|R1-R3|\geq 0$; and/or, it may be configured that $|R1-R2|>|R2-R3|\geq 0$. Since $(R1-R2)*(|V1|-|V2|)\geq 0$, $R1\neq R2$. R2 and R3 may be the same or different, and R1 and R3 may be the same or different. As described above, in a case that the difference between R1 and R2 is large, V1 and V2 are different, and to independently adjust the bias states of the driving transistor T2 in the first pixel circuit 110 and the driving transistor T2 in the second pixel circuit 120. In a case that there is the third light emitting element P3, the difference between R1 and R3 is smaller than the difference between R1 and R2, or the difference between R2 and R3 is smaller than the difference between R1 and R2. Accordingly, the difference between V1 and V3 is smaller than the difference between V1 and V2; that is, $|V1-V2|>|V1-V3|\geq 0$. Or the difference between V2 and V3 is smaller than the difference between V1 and V2; that is, $|V1-V2|>|V2-V3|\geq 0$.

Figure 8:
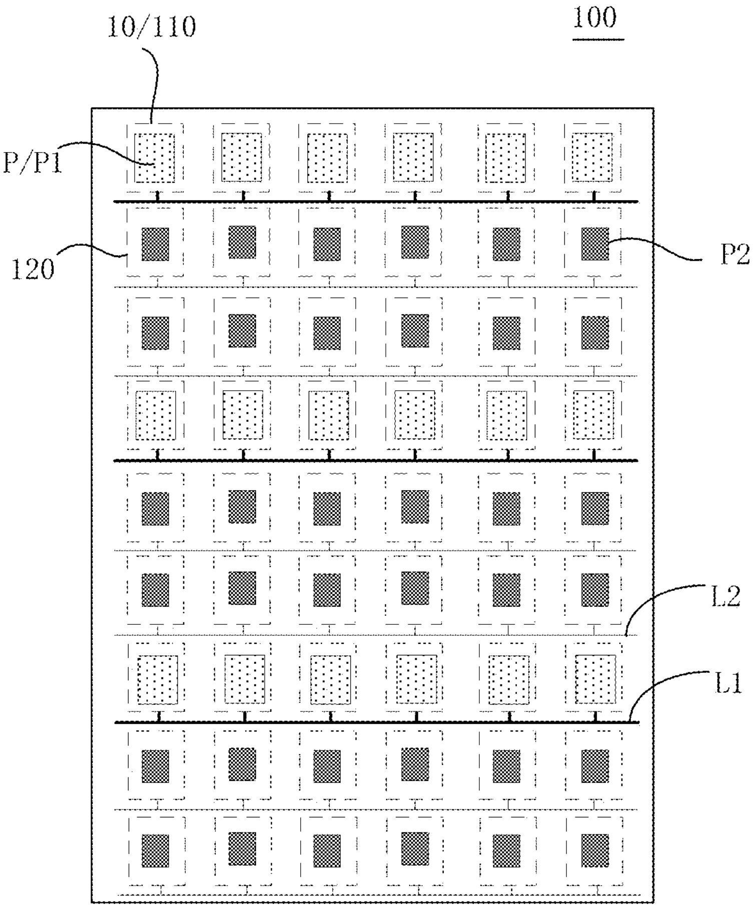
FIG. 8 is a schematic structural diagram of still another display panel according to an embodiment of the present disclosure.

Reference is made to FIG. 8, which is a schematic structural diagram of still another display panel according to an embodiment of the present disclosure. The display panel 100 includes a first bias adjustment signal line L1 and a second bias adjustment signal line L2. The first bias adjustment signal line L1 is configured to transmit the first bias adjustment signal V1, and the second bias adjustment signal line L2 is configured to transmit the second bias adjustment signal V2. In the display panel 100 according to the embodiment of the present disclosure, the first bias adjustment signal V1 and the second bias adjustment signal V2, which are different, are inputted into the first pixel circuit 110 and the second pixel circuit 120 respectively. By providing different bias adjustment signal lines to transmit the first bias adjustment signal V1 and the second bias adjustment signal V2 respectively, the first pixel circuit 110 and the second pixel circuit 120 are respectively provided with the first bias adjustment signal V1 and the second bias adjustment signal V2.

Figure 9:
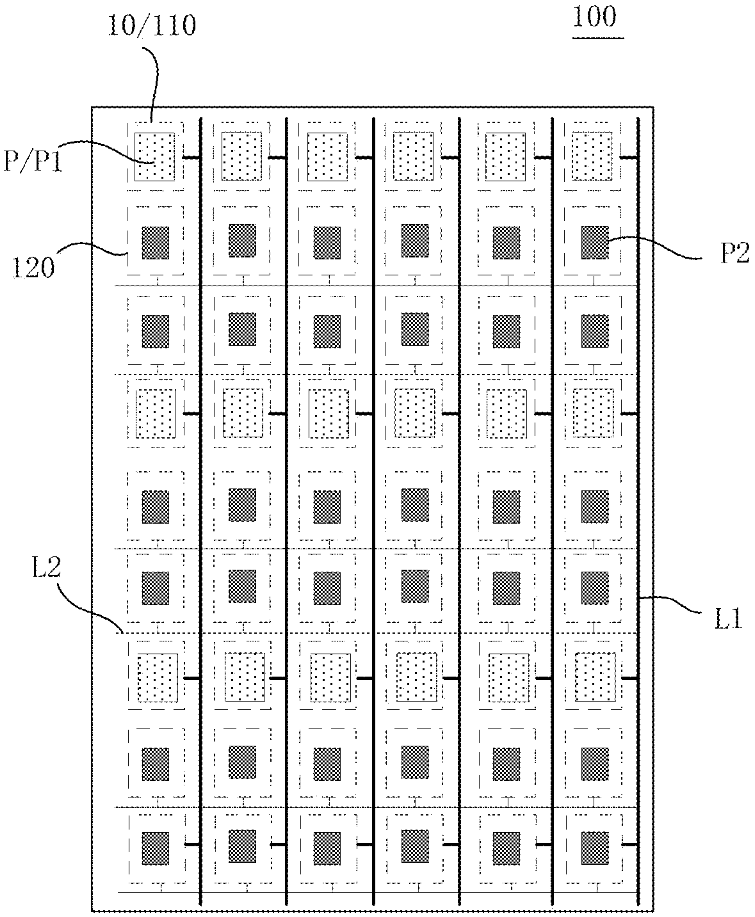
FIG. 9 is a schematic structural diagram of still another display panel according to an embodiment of the present disclosure.

In some embodiments of the present disclosure, as shown in FIG. 8, the first bias adjustment signal line L1 and the second bias adjustment signal line L2 are configured to extend in the same direction. For the light emitting elements 20 arranged in an array, the first bias adjustment signal line L1 and the second bias adjustment signal line L2 may be configured to both extend along the row direction of the array, or along the column direction of the array, which is not limited in the embodiment of the present disclosure Reference is made to FIG. 9, which is a schematic structural diagram of still another display panel according to an embodiment of the present disclosure. In this embodiment, the first bias adjustment signal line L1 extends along a first direction, and the second bias adjustment signal line L2 extends along a second direction, where the first direction intersects the second direction. For the light emitting elements 20 arranged in an array, one of the first bias adjustment signal line L1 and the second bias adjustment signal line L2 may extend along a row direction of the array, and the other may extend along a column direction of the array. In this case, the first direction and the second direction are perpendicular to each other.

In the display panel 100 shown in FIG. 8, the arrangement of the first bias adjustment signal line L1 and the second bias adjustment signal line L2 is illustrated, with the light emitting elements 20 arranged in an array for example. It is readily understandable that the first bias adjustment signal line L1 and the second bias adjustment signal line L2 may be arranged according to the layout of the light emitting elements 20 in the display panel 100, without being limited to the arrangements shown in FIG. 7 and FIG. 8.

In an embodiment of the present disclosure, the display panel 100 includes a first light emitting element group and a second light emitting element group. The first light emitting element group includes N1 rows of first light emitting elements P1 arranged along a first preset direction, where $N1\geq 1$. The second light emitting element group includes N2 rows of second light emitting elements P2 arranged along the first preset direction, where $N2\geq 1$. First pixel circuits 110 connected to the N1 row of light emitting elements 20 in the first light emitting element group are connected to the first bias adjustment signal line L1 to receive the first bias adjustment signal V1. Second pixel circuits 120 connected to the N2 rows of light emitting elements 20 in the second light emitting element group are connected to the second bias adjustment signal line L2 to receive the second bias adjustment signal V2. As shown in FIG. 7 or FIG. 8, the first light emitting element group may include each row of first light emitting elements P1, and the second light emitting element group may include each row of second light emitting elements P2.

In an embodiment, along the first preset direction, the first bias adjustment signal line L1 and the second bias adjustment signal line L2 are arranged in an inter-row gap between the N1 rows of first light emitting elements P1 and/or in an inter-row gap between the N2 rows of second light emitting elements P2. As shown in FIG. 8, the first bias adjustment signal line L1 is located in a gap between two adjacent rows of first light emitting elements P1, and the second bias adjustment signal line L2 is located in a gap between two adjacent rows of second light emitting elements P2. Apparently, in other embodiments, the first bias adjustment signal line L1 and the second bias adjustment signal line L2 may be arranged in an inter-column gap of the N1 rows of first light emitting elements P1 and/or in an inter-column gap of the N2 rows of second light emitting elements P2, along a preset direction.

In some embodiments, along the first preset direction, there are M1 second bias adjustment signal lines L2 between two adjacent first bias adjustment signal lines L1, and there are M2 first bias adjustment signal lines L1 between two adjacent second bias adjustment signal lines L2, where $M1 \geq 1$, and/or, $M2 \geq 1$. As shown in FIG. 8, there are two second bias adjustment signal lines L2 between any two adjacent first bias adjustment signal lines L1, in which case M1=2; there is one first bias adjustment signal line L1 between some adjacent second bias adjustment signal lines L2, in which case M2=1.

In other embodiments, in a case that the light emitting elements 20 in the display panel 100 are as shown in FIG. 8, two rows of second light emitting elements P2 between two adjacent rows of first light emitting elements P1 may share one second bias adjustment signal line L2. In this case, the first bias adjustment signal line L1 and the second bias adjustment signal line L2 are alternately arranged in the column direction, where M1=M2=1.

In a case that the light emitting elements 20 in the display panel 100 are arranged as shown in FIG. 7, if both the first bias adjustment signal line L1 and the second bias adjustment signal line L2 extend along the row direction, the first bias adjustment signal line L1 and the second bias adjustment signal line L2 are alternately arranged in the column direction, where M1=M2=1.

In the embodiment of the present disclosure, a color of the light emitted by the first light emitting element P1 is different from a color of the light emitted by the second light emitting element P2. As described above, the display panel 100 includes three types of light emitting elements 20 with different light emitting colors, where a first type and a second type of the three types of light emitting elements 20 with different light emitting colors are the first light emitting element P1 and the second light emitting element P2, and a third type of the light emitting element may be used as the first light emitting element P1 or the second light emitting element P2, or the third light emitting element P3.

In some embodiments, the color of the light emitted by the first light emitting element P1 may be the same as that of the light emitted by the second light emitting element P2. As described above, the display panel 100 has different display regions, and light emitting elements 20 of the same light emitting color in different display regions may have different areas. In this case, light emitting elements 20 of the same light emitting color located in different display regions may be the first light emitting element P1 and the second light emitting element P2 respectively. For example, the display panel 100 includes a normal display region and a special functional region, and for the light emitting elements 20 of the same light emitting color, light emitting elements 20 of this light emitting color in the normal display region and light emitting elements 20 of this light emitting color in the special functional region have different areas.

Figure 10:
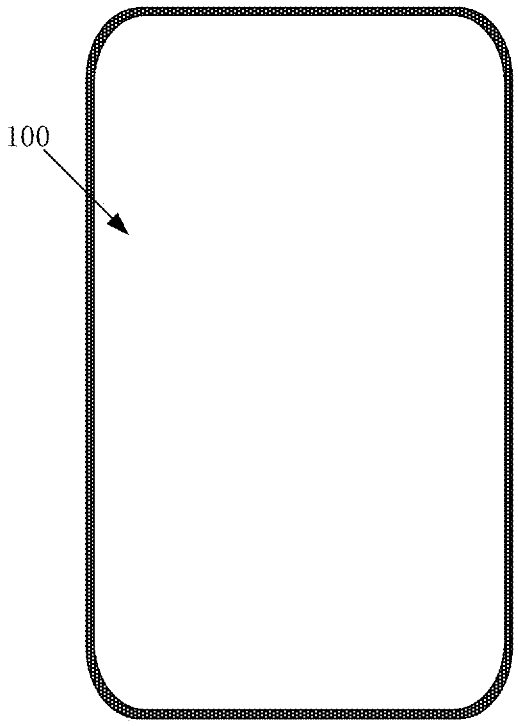
FIG. 10 is a schematic structural diagram of a display device according to an embodiment of the present disclosure.

Based on the above-described embodiment of the display panel, a display device is further provided according to an embodiment of the present disclosure, which may be as shown in FIG. 10.

Reference is made to FIG. 10, which is a schematic structural diagram of a display device according to an embodiment of the present disclosure. The display device includes the display panel 100 described in any one of the above embodiments.

In an embodiment of the present disclosure, the display device may be a mobile phone, a tablet computer, a wearable device, and any other electronic device with a display function. The display device includes the display panel 100 in the above-described embodiments, which uses different bias adjustment signals for adjustment of different bias states, and bias states of different driving transistors can all be properly adjusted in a more targeted manner. In this way, the light emitting elements with different areas can have substantially the same brightness when displaying the same brightness.

The embodiments in this specification are described in a progressive manner, in parallel, or in a progressive-parallel-combined manner. Each embodiment focuses on the differences from the other embodiments, and reference may be made to each other for the same or similar parts. The display device disclosed in the embodiment is briefly described for it corresponds to the display panel according to the embodiments, and reference may be made to the relevant descriptions of the display panel for related parts.

It should be noted that, in the description of the present disclosure, it should be understood that the descriptions of the drawings and embodiments are illustrative rather than restrictive. The same reference numerals identify the same structures throughout the embodiments of the specification. In addition, for the sake of understanding and ease of description, the thickness of some layers, films, panels, regions, etc. may be exaggerated in the drawings. Also, it will be understood that when an element such as a layer, film, region, or substrate is referred to as being "on" another element, it can be directly on the other element or intervening elements may be present. In addition, "on" means positioning an element on or under another element, but does not essentially mean positioning on an upper side of another element according to the direction of gravity.

The orientation or positional relationship indicated by the terms "upper", "lower", "top", "bottom", "inner", "outer", etc. is based on the orientation or positional relationship shown in the drawings, and is only for the convenience of describing the present disclosure and simplified descriptions, rather than indicating or implying that the device or element referred to must have a specific orientation, or be constructed and operate in a specific orientation, and thus should not be construed as limiting the disclosure. When a component is said to be "connected" to another component, it may be directly connected to the other component or there may be an intervening component.

It should also be noted that in this disclosure, relational terms such as first and second etc. are only used to distinguish one entity or operation from one another, and do not necessarily require or imply that these entities or operations has any such actual relationship or sequence therebetween. Moreover, the term "include", "comprise" or any other variation thereof is intended to cover a non-exclusive inclusion and an article or device comprising a set of elements includes not only those elements but also other elements not expressly listed, or also include elements inherent to the article or device. Without further limitations, an element defined by the phrase "comprising a . . . " does not exclude the presence of additional identical elements in an article or device comprising the aforementioned element.

What is claimed is:

1. A display panel, comprising:

a light emitting element and a pixel circuit;

the pixel circuit comprises a driving module, a bias adjustment module, a reset module and an initialization module;

wherein the driving module comprises a driving transistor, the driving transistor comprises a gate electrode, a first electrode and a second electrode;

the bias adjustment module is connected to the first electrode or the second electrode of the driving transistor and is configured to provide a bias adjustment signal for the driving transistor;

the reset module is connected to the gate electrode of the driving transistor and is configured to provide a reset signal for the driving transistor;

the initialization module is connected to the light emitting element and is configured to provide an initialization signal for the light emitting element;

wherein the light emitting element comprises a first light emitting element and a second light emitting element; and the pixel circuit comprises a first pixel circuit and a second pixel circuit, wherein the first pixel circuit is connected to the first light emitting element, the second pixel circuit is connected to the second light emitting element, the bias adjustment signal comprises a first bias adjustment signal and a second bias adjustment signal, the first pixel circuit is configured to receive the first bias adjustment signal, the second pixel circuit is configured to receive the second bias adjustment signal, an area value of the first light emitting element is S1, an area value of the second light emitting element is S2, a voltage value of the first bias adjustment signal is V1, and a voltage value of the second bias adjustment signal is V2, wherein $(S1-S2)\times(|V1|-|V2|)\neq 0$, wherein $(S1-S2)\times(|V1|-|V2|)>0$, or $$(S1-S2)\times(|V1|-|V2|)\neq 0.$$

2. The display panel according to claim 1, wherein the pixel circuit further comprises a data writing module, and a compensation module, the data writing module is connected to the first electrode of the driving transistor and is configured to provide a data signal for the driving transistor, and the compensation module is connected between the gate and the second electrode of the driving transistor.

3. The display panel according to claim 1, wherein $(S1-S2)\times(|V1|-|V2|)>0$, wherein in a case that $S1>S2$, $|S1/S2|>|V1/V2|$; or, in a case that $S1<S2$, $|S1/S2|<|V1/V2|$.

4. The display panel according to claim 1, wherein $(S1-S2)\times(|V1|-|V2|)<0$, wherein in a case that $S1>S2$, $|S1/S2|>|V2/V1|$; or, in a case that $S1<S2$, $|S1/S2|<|V2/V1|$.

5. The display panel according to claim 1, wherein $|S1-S2|/|S2|>|V1-V2|/|V2|$.

6. The display panel according to claim 1, wherein the first pixel circuit comprises a first driving transistor, the second pixel circuit comprises a second driving transistor;

a width-to-length ratio of a channel region of the first driving transistor is R1, and a width-to-length ratio of a channel region of the second driving transistor is R2, wherein, $(R1-R2)\times(|V1|-|V2|)/0$.

7. The display panel according to claim 6, wherein $(R1-R2)\times(|V1|-|V2|)<0$.

8. The display panel according to claim 7, wherein in a case that $R1>R2$, $|R1/R2|>|V2/V1|$; or, in a case that $R1<R2$, $|R1/R2|<|V2/V1|$.

9. The display panel according to claim 6, wherein $(R1-R2)\times(|V1|-|V2|)>0$.

10. The display panel according to claim 9, wherein in a case that $R1>R2$, $|R1/R2|>|V1/V2|$; or, in a case that $R1<R2$, $|R1/R2|<|V1/V2|$.

11. The display panel according to claim 1, wherein the light emitting element further comprises a third light emitting element;

the pixel circuit further comprises a third pixel circuit connected to the third light emitting element;

the bias adjustment signal further comprises a third bias adjustment signal; and an area value of the third light emitting element is S3, and a voltage value of the third bias adjustment signal is V3, wherein $|V1-V2|>|V2-V3|\geq 0$; and/or, $|V1-V2|>|V1-V3|\geq 0$.

12. The display panel according to claim 11, wherein $S1\neq S2\neq S3$.

13. The display panel according to claim 11, wherein $|S1-S2|>|S1-S3|\geq 0$; and/or, $|S1-S2|>|S2-S3|\geq 0$.

14. The display panel according to claim 11, wherein the first pixel circuit comprises a first driving transistor, the second pixel circuit comprises a second driving transistor, the third pixel circuit comprises a third driving transistor;

a width-to-length ratio of a channel region of the first driving transistor is R1, a width-to-length ratio of a channel region of the second driving transistor is R2, and a width-to-length ratio of a channel region of the third driving transistor is R3, wherein $|R1-R2|>|R1-R3|>0$; and/or, $|R1-R2|>|R2-R3|\geq 0$.

15. The display panel according to claim 1, further comprises a first bias adjustment signal line and a second bias adjustment signal line, wherein the first bias adjustment signal line is configured to transmit the first bias adjustment signal, and the second bias adjustment signal line is configured to transmit the second bias adjustment signal line.

16. The display panel according to claim 15, wherein the first bias adjustment signal line and the second bias adjustment signal line extend in a same direction.

17. The display panel according to claim 15, wherein the first bias adjustment signal line extends along a first direction, the second bias adjustment signal line extends along a second direction, and the first direction intersects the second direction.

18. A display device comprising a display panel, wherein the display panel comprises:

a light emitting element and a pixel circuit;

the pixel circuit comprises a driving module, a bias adjustment module, a reset module and an initialization module;

wherein the driving module comprises a driving transistor, the driving transistor comprises a gate electrode, a first electrode and a second electrode;

the bias adjustment module is connected to the first electrode or the second electrode of the driving transistor and is configured to provide a bias adjustment signal for the driving transistor;

the reset module is connected to the gate electrode of the driving transistor and is configured to provide a reset signal for the driving transistor;

the initialization module is connected to the light emitting element and is configured to provide an initialization signal for the light emitting element;

wherein the light emitting element comprises a first light emitting element and a second light emitting element; and the pixel circuit comprises a first pixel circuit and a second pixel circuit, wherein the first pixel circuit is connected to the first light emitting element, the second pixel circuit is connected to the second light emitting element, the bias adjustment signal comprises a first bias adjustment signal and a second bias adjustment signal, the first pixel circuit is configured to receive the first bias adjustment signal, the second pixel circuit is configured to receive the second bias adjustment signal, an area value of the first light emitting element is S1, an area value of the second light emitting element is S2, a voltage value of the first bias adjustment signal is V1, and a voltage value of the second bias adjustment signal is V2, wherein $(S1-S2)\times(|V1|-|V2|)\neq 0$, wherein $(S1-S2)\times(|V1|-|V2|)>0$, or $(S1-S2)\times(|V1|-|V2|)<0$.

* * * * *